(12) United States Patent
Cooper

(10) Patent No.: US 6,397,211 B1
(45) Date of Patent: May 28, 2002

(54) SYSTEM AND METHOD FOR IDENTIFYING USELESS DOCUMENTS

(75) Inventor: James W. Cooper, Wilton, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/476,943

(22) Filed: Jan. 3, 2000

(51) Int. Cl.[7] ............................................... G06F 17/30
(52) U.S. Cl. ........................... 707/3; 707/10; 707/204; 707/513; 704/9; 709/219
(58) Field of Search ................................ 707/1, 2, 3, 4, 707/5, 6, 7, 9, 10, 102, 202, 204, 500, 513; 704/9; 709/219; 706/12

(56) References Cited

U.S. PATENT DOCUMENTS

| | | | |
|---|---|---|---|
| 5,168,565 A | * 12/1992 | Morita | 707/3 |
| 5,845,278 A | * 12/1998 | Kirsch et al. | 707/1 |
| 5,915,249 A | * 6/1999 | Spencer | 707/10 |
| 5,943,669 A | * 8/1999 | Numata | 704/9 |
| 6,070,158 A | * 5/2000 | Kirsch et al. | 707/10 |
| 6,199,074 B1 | * 3/2001 | Kern et al. | 707/204 |
| 6,233,575 B1 | * 5/2001 | Agrawal et al. | 706/12 |
| 6,272,507 B1 | * 8/2001 | Pirolli et al. | 707/513 |
| 6,327,590 B1 | * 12/2001 | Chidlovskii et al. | 707/5 |

OTHER PUBLICATIONS

Bun, Khoo Khyou et al., "Emerging Topic Tracking System", Third International Workshop on Advanced Issues of E–Commerce and Web–Based Information Systems, Jun. 21–22, 2001, pp. 2–11.*

Jeong, Byeong–Soo et al., "Inverted File Partitioning Schemes in Multiple Disk Systems", IEEE Transactions on Parallel And Distributed Systems, vol. 6, No. 2, Feb. 1995, pp. 142–153.*

Li, Xiaonong et al., "Fast Shape Retrieval Using Term Frequency Vectors", Proceedings of the IEEE Workshop on Content–Based Access of Image and Video Libraries, Jun. 22, 1999, pp. 18–22.*

* cited by examiner

Primary Examiner—Hosain T. Alam
Assistant Examiner—Shahid Al Alam
(74) Attorney, Agent, or Firm—Louis J. Percello; Dilworth & Barrese, LLP

(57) ABSTRACT

A system and method are disclosed for identifying useless or insignificant documents in a document hit list assembled from documents stored in one or more document collection databases. A search engine is used to compose the document hit list based on a query presented by a user. A text extraction algorithm run by a processor is then used to process the documents identified by the document hit list to produce a table of terms and their corresponding collection-level importance ranking called the IQ or Information Quotient. The text algorithm also produces a table of the most important terms per document. The documents are also scanned independently and a table of documents with filenames and lengths is also produced. A summarizing text algorithm is also run by a processor against the documents of the document hit list to produce a table of terms having a high tf*idf value for each document. All of the tables are stored in a relational database, which allows the system of the present invention to generate a table of terms per document ranked by decreasing IQ. To determine whether a document is useful or useless, the table of terms and IQs, the table of most important terms per document, the table of documents with filename and lengths, and the table of high tf*idf values are examined.

23 Claims, 3 Drawing Sheets

SYSTEM AND METHOD FOR IDENTIFYING USELESS DOCUMENTS

FIELD OF THE INVENTION

This invention relates to the field of digital libraries. Specifically, it discloses a system and method for identifying useless documents in a document hit list assembled after performing a search among documents stored in a digital library collection, such that these documents can be filtered and eliminated from the document hit list.

BACKGROUND OF THE INVENTION

The task of finding important and relevant documents in an online document collection is becoming increasingly difficult as documents proliferate. Several techniques have been developed within document retrieval systems to assist users in focusing or directing their queries more effectively, such as the Prompted Query Refinement technique described by Cooper et al. in "Lexical Navigation: Visually Prompted Query Expansion and Refinement," Proceedings of DIGLIB97, Philadelphia, Pa., July, 1997; and by Cooper et al. in "OBIWAN-A Visual Interface for Prompted Query Refinement," Proceedings of HICSS-31, Kona, Hi., 1998. These references, and all other references referenced in this specification are herein incorporated by reference in their entirety. However, even after a query has been refined, the problem of having to read too many documents still remains.

To counteract such a daunting task of having to read too many documents, techniques have been developed for producing rapid displays of the most salient sentences in a document, as described by Neff et al. in "Document Summarization for Active Markup," Proceedings of the $32^{nd}$ Hawaii International Conference on System Sciences, Wailea, Hi, January, 1999; and by Neff et al. in "A Knowledge Management Prototype," Proceedings of NLDB99, Klagenfurt, Austria, 1999. Based on these techniques, users can prefer to read or browse through only those documents returned by a search engine which are important to the area they are investigating. However, even with these summarization techniques, the document retrieval systems are still not able to predict which documents will be most useful to the user.

Other techniques for solving document retrieval problems entail having the user interact with the document retrieval system. For example, one technique described in the literature entails, in a multi-window document interface, having a user to drag terms into search windows and see relationships between terms in a graphical environment. Further, Schatz et al. in "Interactive Tern Suggestion for Users of Digital Libraries," ACM Digital Library Conference, 1996 describes a multi-window interface that offers user access to a variety of published thesauruses and computed term co-occurrence data. However, these techniques are prone to user errors (e.g., the user selects a term which is non-pertinent to his investigation to further refine the search) and are time-consuming, since user intervention is necessitated. Accordingly, these prior art document retrieval techniques and other known techniques are not capable of filtering document hit lists, such that documents having limited utility, even though they may match many of the search terms fairly accurately, can be removed or downgraded in terms of their ranking, in order to present the most useful documents to the user. Hence, an object of this invention is a system and method for identifying useless documents in a document hit list, such that these documents can be filtered and eliminated from the document hit list.

SUMMARY

The present invention is essentially a system and method for identifying useless or insignificant documents in a document hit list assembled from documents stored in one or more document collection database memories. A search engine is used to compose the document hit list based on a query presented by a user. A text extraction algorithm run by a processor is then used to process the documents identified by the document hit list to produce a table of terms and their corresponding collection-level importance ranking called the IQ or Information Quotient. The text extraction algorithm also produces a table of the most important terms per document. The documents are also scanned independently and a table of documents with filenames and lengths is also produced.

A summarizing text algorithm is also run by a processor against the documents of the document hit list to produce a table of terms having a high tf*idf (term frequency times inverted document frequency) value for each document. All of the tables are stored in a relational database, which allows the system of the present invention to generate a table of terms per document ranked by decreasing IQ. To determine whether a document is useful or useless, the table of terms and IQs, the table of most important terms per document, the table of documents with filename and lengths, and the table of high tf*idf values are examined. A document is found to be useless if one of the following two conditions is true: (i) the document has a document length of less than 2,000 bytes, or (ii) the document has less than five terms with an IQ greater than 60, the document has less than six appearances of terms having a tf*idf value of greater than 2.2, and the document has a document length of less than 40,000 bytes. The document length parameter may vary depending on the document format.

DETAILED DESCRIPTION OF THE INVENTION

Figure 1:
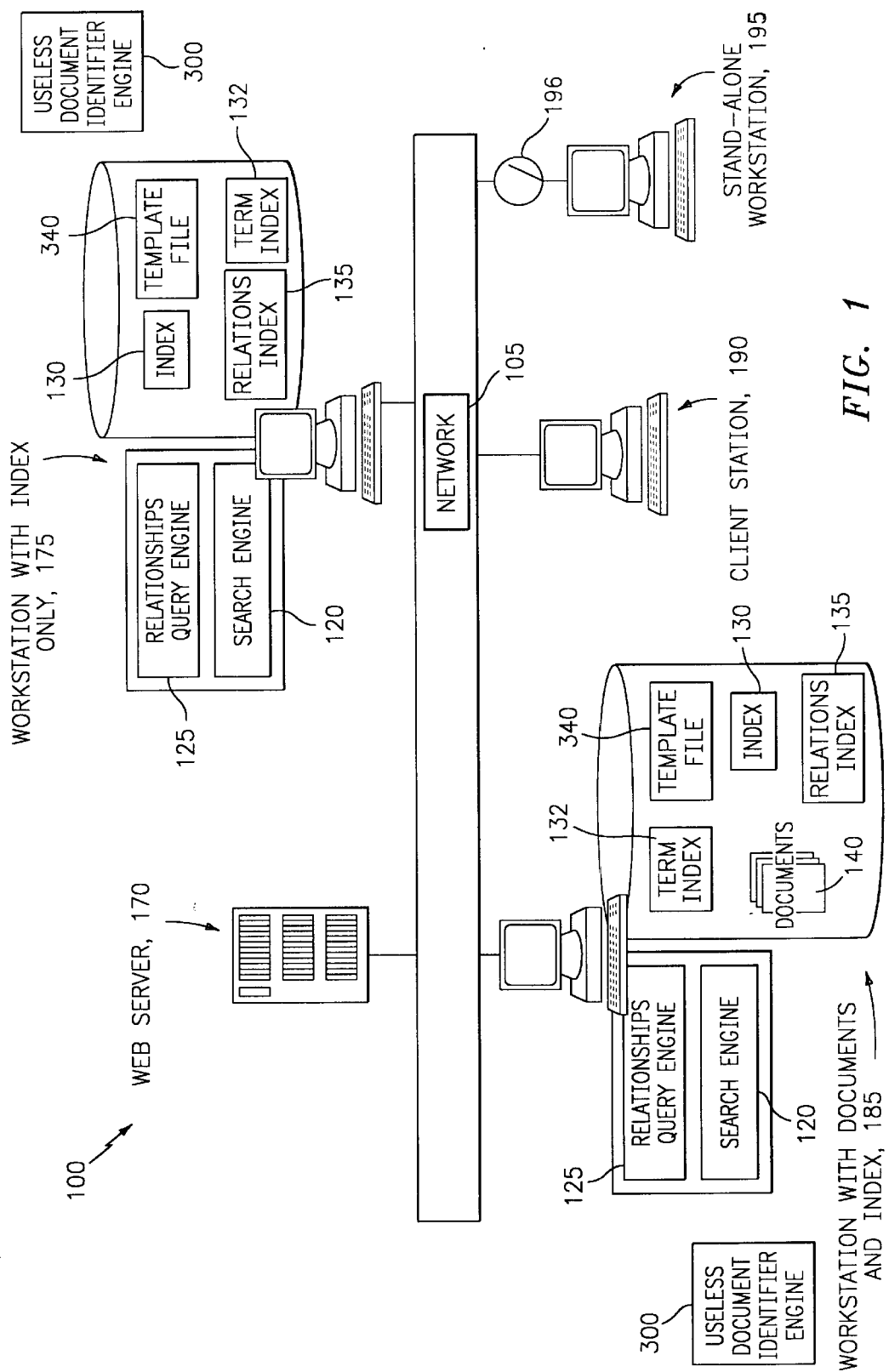
FIG. 1 is an illustration of a typical networked search system that uses the present invention.

FIG. 1 illustrates a typical networked search system designated generally by reference numeral 100. A number of general purpose computer systems and workstations 170, 175, 185, 190, 195 are attached to a network 105. Examples of general purpose computers include the IBM Aptiva personal computer, the IBM RISC System/6000 workstation, and the IBM POWER parallel computer SP2. (These are trademarks of IBM Corporation.) The network 105 may be a local area network (LAN), a wide area network (WAN) or the Internet. Moreover, some of the computers in this environment may support the Web information exchange protocol (HTTP) and be part of a local Web or the World Wide Web (WWW). Some computers (e.g., 195) may be occasionally, or always, disconnected as at switch 196 from the network and operate as stand-alone computers.

The system 100 preferably consists of a workstation 185 containing a collection of documents 140 and indexes 130, 132, 135 of documents 140 and template file 340, and/or of a workstation 175 containing only the indexes 130, 132, 135 to documents 140 and template file 340. Both systems utilize a search engine program 120 to search these indices and a relations query engine 125 to search an index 135 of the relations based on a user entering a query. The system 100 also consists of a Web server computer 170 which provides a way of viewing these documents and the links between them. A useless document identifier engine 300 executed by at least one processor in the system 100 identifies useless documents and removes them or downgrades their ranking before they are returned to the user as further described below with reference to FIG. 2. The client workstation computers may be directly tied to the network or connected occasionally using dial-in or other technologies.

Figure 2:
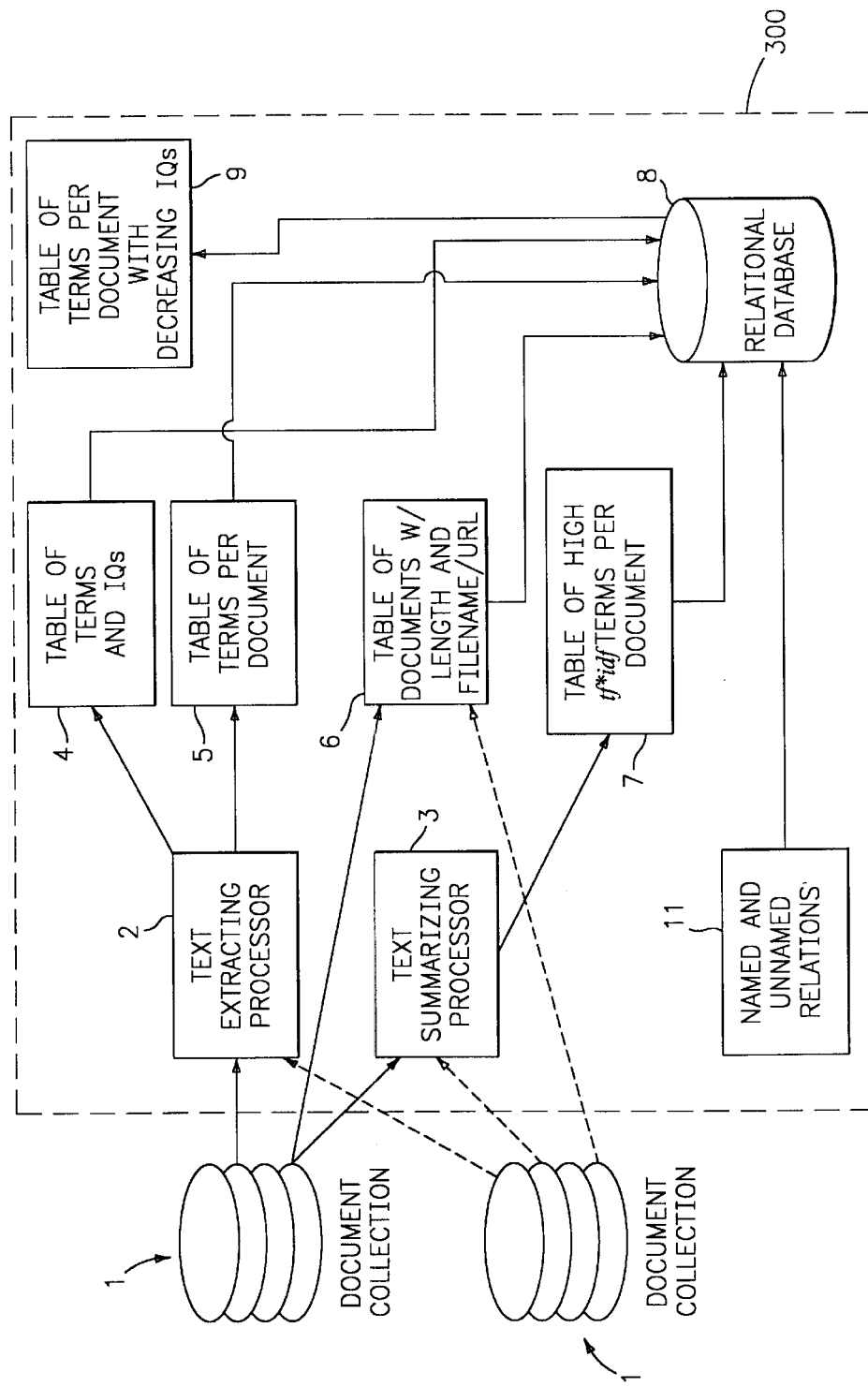
FIG. 2 is a block diagram of a useless document identifier engine for identifying useless documents according to the present invention.

With reference to FIG. 2, there is shown the useless document identifier engine 300 for identifying useless documents in a document hit list assembled from documents stored in one or more document collection databases, such as workstation 185. As shown in FIG. 2, the useless document identifier engine 300 has access to at least one document collection database 1, such as workstations 175, 185 containing a collection of documents 140. The engine 300 preferably includes a text extraction processor 2, a text summarizing processor 3, and a relational database 8 The text extraction processor 2 runs a text extraction algorithm against the documents of the document hit list. The text summarizing processor 3 runs a text summarizing algorithm against the documents of the document hit list. Preferably, the document hit list is assembled from documents stored in the document collection databases satisfying the user's query.

After running the text extraction algorithm, the text extraction processor 2 outputs a table of terms and their corresponding collection-level importance ranking known as the Information Quotient (IQ) 4 and a table of most important terms per document 5. The IQ is described by Cooper et al. in "OBIWAN-A Visual Interface for Prompted Query Refinement," Proceedings of HICSS-31, Kona, Hi., 1998; the contents of which are incorporated herein by reference. The text summarizing processor 3 runs the text summarizing algorithm and outputs a table of high tf*idf (terms frequency times inverted document frequency) terms per document 7. The tf*idf measure is described by Salton et al. in An Introduction to Modem Informational Retrieval, McGraw-Hill, 1993; the contents of which are incorporated herein by reference. The documents are also scanned independently and a table of documents with filenames and lengths (i.e., byte-sizes) 6 is also produced. All of the tables are stored in the relational database 8, which allows the useless document identifier engine 300 to generate a table of terms per document ranked by decreasing IQ 9. Table 9 provides information on which documents are useless and which documents are useful.

A detailed description of the text extraction processor 2 and the text summarizing processor 3 follows. The text extraction processor 2 can run any text extraction algorithm which includes a chain of tools for recognizing multi-word terms and proper names as is known in the art. Such text extraction algorithms reduce related forms of a term to a single canonical form that it can then use in computing term occurrence statistics more accurately. In addition, the text extraction algorithm recognizes abbreviations and finds the canonical forms of the words they stand for and aggregates these terms into a vocabulary for the entire collection, and for each document, keeping both document and collection-level statistics on these terms. Each term is assigned a corresponding IQ to produce the table of terms and corresponding IQs 4. IQ is effectively a measure of the document selectivity of a particular term. A term which appears in only a few documents is highly selective and has a high IQ. On the other hand, a term that appears in many documents is far less selective and has a low IQ. As indicated above, two of the major outputs of the text extraction algorithm which are of importance to the present invention are the table of IQ and collection statistics for each of the canonical terms 4, and the table of the most important terms found in each document 5. Both tables are stored in the relational database 8.

The text summarizing processor 3 can run any text summarizing algorithm which can produce a structural representation of the document, identifying sections, headings, paragraphs, tables, etc. as is known in the art. According to the principles of the present invention, the text summarizing algorithm locates, counts, and extracts items of interest, such as names, multi-word terms and abbreviations. Further, the text summarizing algorithm compares the frequency of the items found in the text of a document to the frequency of the same item in a collection database (the collection database may be stored within the document collection databases 1), using the tf*idf measure described by Salton et al.

In brief, tf*idf measures how much more frequent, relatively, a term is in the document than it is in the collection database. Items whose tf*idf exceeds an experimental threshold are identified as signature terms. Further, preferably, items occurring in the title and in headings are added to the list of signature terms, regardless of their tf*idf. A salience score for a sentence can then be derived based on a function of the sum of the tf*idfs of the signature words in it, how near is the sentence to the beginning of the paragraph, and how near the paragraph the sentence is in is to the beginning of the document. Sentences with no signature words would preferably get no "location" score; however, low-scoring or non-scoring sentences that immediately precede higher-scoring ones in a paragraph can be promoted under certain conditions.

It is preferred that sentences are disqualified if they are too short (e.g., five words or less) or contain direct quotes (i.e., more than a minimum number of words enclosed in quotes). Documents with multiple sections are treated as special cases. For example, a long document with several section headings or a news digest containing multiple sectionalized stories are specially treated. That is to ensure that each section is represented in the summary, the long document's highest scoring sentences are included, or, if there are none, the first sentence(s) in each section. All of the tf*idf data and data derived therefrom, e.g., salience scores, are then stored in the relational database 8.

It is contemplated that other types of data can also be stored in the relational database 8 which may be useful in identifying useless documents. These other types of data may be produced by a processor running algorithms designed to generate such data and is capable of transmitting the data to the relational database 8. For example, such other types of data can include but are not limited to named and unnamed relations 11. Named relations, as described by Byrd et al. in "Identifying and Extracting Relations in Text," Proceedings of NLDB 99, Klagenfurt, Austria, 1999, are derived by a shallow parsing of the sentences in each document and by recognizing over twenty common English patterns which show a named relation between two terms. Two of the most common of these patterns are appositives and parenthetical phrases, such as "John Smith, CEO of X Corp., said today . . . ."

A named relations finder algorithm recognizes "John Smith" as a proper name and "X Corp." as a proper name, and assigns the named relation "CEO" to these two terms. Note that such an algorithm looks for patterns rather than specific English phrases and is quite general. Typically, several hundred different kinds of names for relations, and several thousand actual relations are found in a collection of several thousand documents. The named relations finder algorithm can also assign a direction between these relations, so that a relationship like "makes" or "is located in" points from a company to a product or city name. These names and terms they relate to are preferably entered as rows in relations tables stored in the relational database 8.

Unnamed relations are strong bi-directional relations between terms which not only co-occur but occur together frequently in the collection. These terms are recognized from the document and term statistics gathered by the text extraction processor 2 and by the relative locations of the terms in the document. These unnamed relations are stored in the relational database 8.

Figure 3:
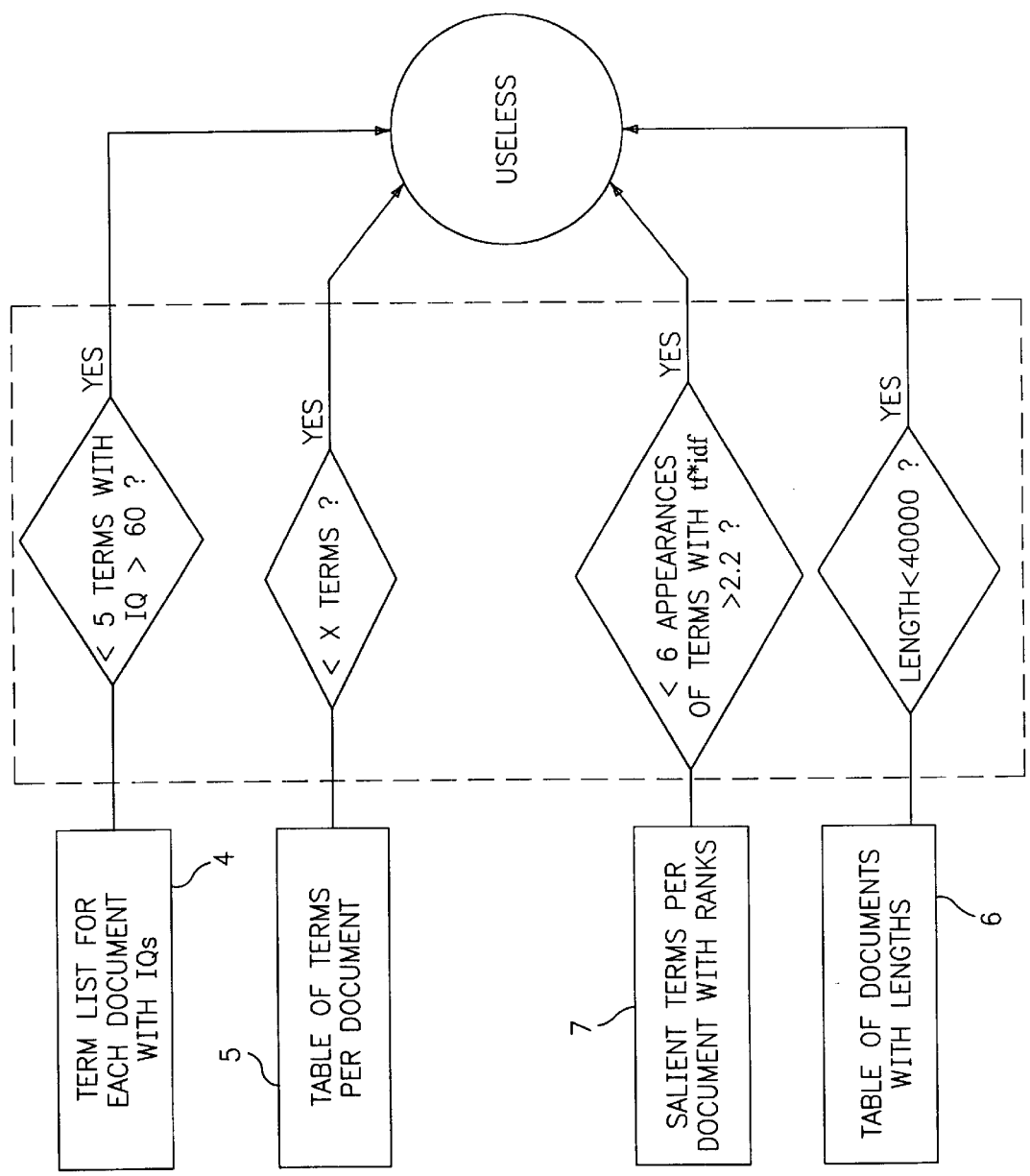
FIG. 3 is a diagram illustrating the method for identifying useless documents according to present invention.

With reference to FIG. 3, a method will now be described according to the present invention for determining whether a document is useful or useless. Accordingly, the table of terms and IQs 4, the table of most important terms per document 5, the table of documents with filename and lengths 6, and the table of high tf*idf values 7 generated by the useless document identifier engine 300 are examined. These tables are processed simultaneously or individually by the useless document identifier engine 300 after the engine 300 is executed by one or more processors of system 100. Accordingly, the useless document identifier engine 300 is an algorithm or a set of programmable instructions executed by one or more processors of system 100. After the useless document identifier engine 300 is executed, the useless documents are removed from the document hit list or their corresponding ranking (preferably, assigned by the engine 300) is downgraded, according to pre-programmed instructions.

In a preferred embodiment, the useless document identifier engine 300 identifies a document to be useless if one of the following two conditions is true: (i) the document has a document length of less than 2,000 bytes, or (ii) the document has less than five terms with an IQ greater than 60, the document has less than six appearances of terms having a tf*idf value of greater than 2.2, and the document has a document length of less than 40,000 bytes. It is contemplated that these parameters of finding a document useless can be altered or changed according to a user's preferences. For example, the document length parameter may vary depending on the document format. In particular, documents represented in formats such as LOTUS NOTES™ and MICROSOFT ACCESS™ will need to be calibrated for the characteristics of such format. Another parameter that could be used is whether a specific document has less than "x" terms, where "x" is a predetermined number, using Table 5, as shown by FIG. 3.

It is also contemplated that a single parameter can be initially used for filtering useless documents, before applying additional parameters to the remaining documents. For example, all very short documents can be declared a priori to be useless without invoking further measures, e.g., all documents less than 2,000 bytes, and all very long documents can be assumed to be useful, e.g., all documents greater than 40,000 bytes. The size cutoffs chosen can be dependent on the document collection and how it was produced. Further, all documents having a low count of salient tf*idf terms can be identified as useless regardless of the score of sentence salience. Additionally, all documents having a high number of high IQ words, but a low count of repeated tf*idf words can be identified as useless.

Other parameters that could be used to determine if a document is useless according to the principles of the present invention include but are not limited to whether a document is very short (such as "This is a test document."), whether the document is an outline or a template, whether the document contains large amount of numbers with little or no content, whether the document is a bullet chart presentation, and whether the document is in a language other than English.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

I claim:

1. A processing system for identifying useless documents, comprising:

at least one document database storing a plurality of documents;

at least one processor;

a search engine, executed by the at least one processor, that accesses at least one document stored within the at least one document database satisfying a query; and a useless document identifier engine, executed by the at least one processor, for identifying useless documents from the at least one accessed document, the useless document identifier engine determining if the at least one accessed document is useless by determining if one of the following two conditions is true:

(i) a length of the at least one accessed document is less than a first predetermined amount of bytes; or (ii) the length of the at least one accessed document is less than a second predetermined amount of bytes, the at least one accessed document has less than a predetermined number of terms with an Intelligent Quotient (IQ) greater than a first predetermined number, and the at least one accessed document has less than a predetermined number of appearances of terms having a tf*idf value of greater than a second predetermined number.

2. The processing system of claim 1, wherein the at least one document database is a workstation.

3. The processing system of claim 1, wherein the useless document identifier engine is an algorithm translated to programmable instructions.

4. The processing system of claim 1, wherein the first predetermined amount of bytes is 2,000 bytes.

5. The processing system of claim 1, wherein the second predetermined amount of bytes is 40,000 bytes.

6. The processing system of claim 1, wherein the predetermined number of terms is five.

7. The processing system of claim 1, wherein the first predetermined number is 60.

8. The processing system of claim 1, wherein the predetermined number of appearances of terms is six.

9. The processing system of claim 1, wherein the second predetermined number is 2.2.

10. The processing system of claim 1, wherein the useless document identifier engine removes all identified useless documents from a document hit list listing all documents satisfying the query which includes the at least one accessed document.

11. The processing system of claim 1, wherein the useless document identifier engine assigns a corresponding ranking to the at least one accessed document.

12. The processing system of claim 11, wherein the useless document identifier engine downgrades the corresponding ranking of all identified useless documents.

13. A method for identifying if a document is useless, the method comprising the steps of:

determining if a length of the document is less than a first predetermined amount of bytes; and determining if the length of the document is less than a second predetermined amount of bytes, determining if the document has less than a predetermined number of terms with an Intelligent Quotient (IQ) greater than a first predetermined number, and determining if the document has less than a predetermined number of appearances of terms having a tf*idf value of greater than a second predetermined number, if it is determined that the length of the document is greater than or equal to the first predetermined amount of bytes.

14. The method of claim 13, wherein the first predetermined amount of bytes is 2,000 bytes.

15. The method of claim 13, wherein the second predetermined amount of bytes is 40,000 bytes.

16. The method of claim 13, wherein the predetermined number of terms is five.

17. The method of claim 13, wherein the first predetermined number is 60.

18. The method of claim 13, wherein the predetermined number of appearances of terms is six.

19. The method of claim 13, wherein the second predetermined number is 2.2.

20. The method of claim 13, wherein the useless document identifier engine removes the document from a document hit list listing all documents satisfying a query if the document is determined to be useless.

21. The method of claim 13, wherein the useless document identifier engine assigns a corresponding ranking to the document.

22. The method of claim 21, wherein the useless document identifier engine downgrades the corresponding ranking of the document if the document is determined to be useless.

23. A processing system for identifying documents, comprising:

at least one document database storing a plurality of documents;

at least one processor;

a search engine, executed by the at least one processor, that accesses at least one document stored within the at least one document database satisfying a query; and a document identifier engine, executed by the at least one processor, for identifying documents from the at least one accessed document, the document identifier engine determining if the at least one accessed document is pertinent to a user by determining and analyzing user-defined parameters of the at least one accessed document, wherein said user-defined parameters includes:

(i) a length of the at least one accessed document is less than a first predetermined amount of bytes; or (ii) the length of the at least one accessed document is less than a second predetermined amount of bytes, the at least one accessed document has less than a predetermined number of terms with an Intelligent Quotient (IQ) greater than a first predetermined number, and the at least one accessed document has less than a predetermined number of appearances of terms having a tf*idf value of greater than a second predetermined number.

* * * * *